United States Patent
Fountain

(10) Patent No.: US 9,992,168 B2
(45) Date of Patent: Jun. 5, 2018

(54) DATA TRANSFER

(71) Applicant: BAE SYSTEMS plc, London (GB)

(72) Inventor: James Graham Fountain, Preston (GB)

(73) Assignee: BAE SYSTEMS plc, London (GB)

( * ) Notice: Subject to any disclaimer, the term of this patent is extended or adjusted under 35 U.S.C. 154(b) by 131 days.

(21) Appl. No.: 14/762,668

(22) PCT Filed: Jan. 29, 2014

(86) PCT No.: PCT/GB2014/050223
§ 371 (c)(1),
(2) Date: Jul. 22, 2015

(87) PCT Pub. No.: WO2014/118526
PCT Pub. Date: Aug. 7, 2014

(65) Prior Publication Data
US 2015/0372986 A1   Dec. 24, 2015

(30) Foreign Application Priority Data

Jan. 31, 2013   (EP) ..................................... 13275019
Jan. 31, 2013   (GB) ................................... 1301701.7

(51) Int. Cl.
*G06F 15/173*   (2006.01)
*H04L 29/06*   (2006.01)
(Continued)

(52) U.S. Cl.
CPC .............. *H04L 63/04* (2013.01); *G06F 21/60* (2013.01); *H04L 12/4641* (2013.01); *H04L 12/4675* (2013.01); *H04L 63/0272* (2013.01)

(58) Field of Classification Search
CPC . H04L 63/04; H04L 12/4675; H04L 12/4641; H04L 63/0272; G06F 21/60
See application file for complete search history.

(56) References Cited

U.S. PATENT DOCUMENTS 7,864,681 B2 *   1/2011   Shore ...................... H04L 47/10
                                                      370/235
9,042,355 B2 *   5/2015   Thomasson ........ H04B 7/18528
                                                      370/329
(Continued)

FOREIGN PATENT DOCUMENTS

EP   1045553 A2   10/2000
EP   1619828 A1   1/2006
(Continued)

OTHER PUBLICATIONS

International Preliminary Report on Patentability received for Patent Application No. PCT/GB2014/050223, dated Aug. 13, 2015. 6 pages.
(Continued)

*Primary Examiner* — Michael A Keller
(74) *Attorney, Agent, or Firm* — Finch & Maloney PLLC

(57) ABSTRACT

A data transfer system includes a set of switch and/or router devices (104B, 104E, 104F), each said device in the set being a layer 1, 2 and/or 3 device of OSI seven-layer model and being configured, in use, to transfer data, directly or indirectly, between a plurality of computing devices (102A, 102B). Each said switch or router device in the set is configured to provide a virtual partition (VP), wherein only data designated as virtual partition data is transferrable to another said device in the set via the virtual partition.

16 Claims, 1 Drawing Sheet

(51) Int. Cl.
*H04L 12/46* (2006.01)
*G06F 21/60* (2013.01)

(56) References Cited

U.S. PATENT DOCUMENTS

| | | | |
|---|---|---|---|
| 2002/0022483 A1 | 2/2002 | Thompson et al. | |
| 2007/0058638 A1* | 3/2007 | Guichard | H04L 12/4641 370/395.31 |
| 2007/0192459 A1* | 8/2007 | Horimoto | G06F 9/45537 709/223 |
| 2008/0013481 A1* | 1/2008 | Simons | H04L 63/104 370/328 |
| 2008/0071924 A1* | 3/2008 | Chilukoor | H04L 47/10 709/240 |
| 2009/0010249 A1* | 1/2009 | Gass | H04L 61/2015 370/352 |
| 2011/0222439 A1* | 9/2011 | Long | H04L 12/4633 370/255 |
| 2014/0050077 A1* | 2/2014 | Kasat | H04L 69/40 370/216 |

FOREIGN PATENT DOCUMENTS

| | | |
|---|---|---|
| EP | 2549689 A2 | 1/2013 |
| GB | 2342825 A | 4/2000 |
| WO | 2002075548 A1 | 9/2002 |
| WO | 2012113007 A1 | 8/2012 |
| WO | 2014118526 A1 | 8/2014 |

OTHER PUBLICATIONS

International Search Report and Written Opinion received for Patent Application No. PCT/GB2014/050223, dated Jun. 16, 2014. 8 pages.
GB Intellectual Property Office Search Report under Section 17(5) received for GB Patent Application No. 1301701.7 dated Jul. 26, 2013. 6 pages.
Extended European Search Report received for EP Patent Application No. 13275019.1, dated Sep. 3, 2013, 6 pages.
Yousef, Bushar and Hoang, Doan B., "Partitioning and Differentiated Resource Allocation in Programmable Networks," Proceedings of the 10th IEEE Symposium on Computers and Communications, 2005. 6 pages.

* cited by examiner

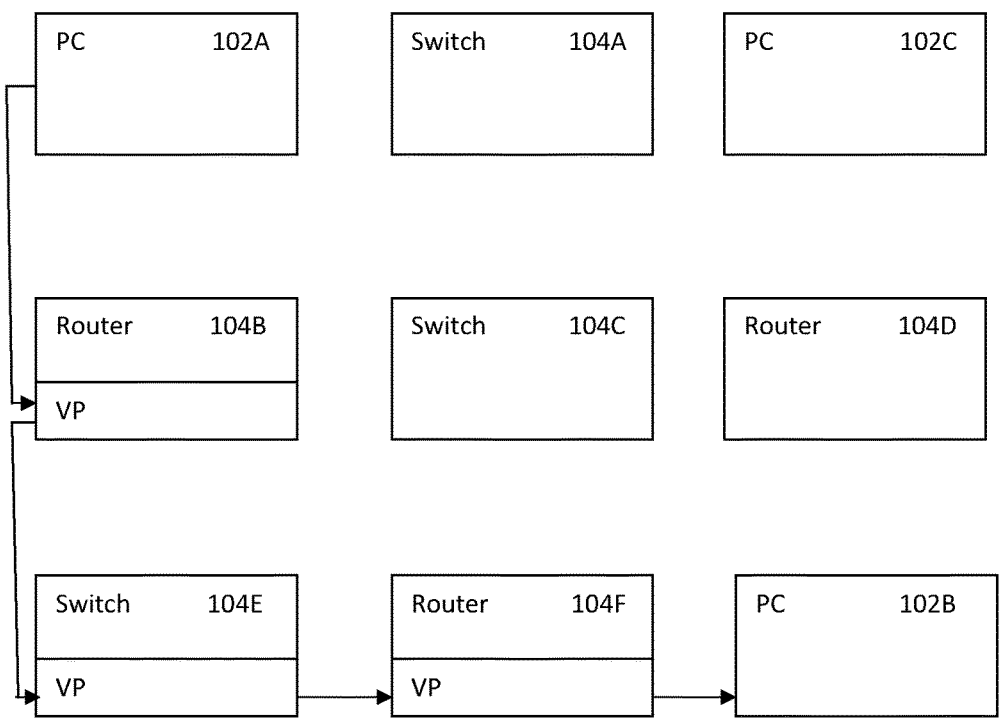

DATA TRANSFER

The present invention relates to data transfer.

There are innumerable uses for secure and reliable data transfer, including governmental, commercial and private uses. One example is a secure, reliable Virtual Internet for emergency services, which can provide a consistent level of service at all times of day and year, etc. Since this would be secured against everything not connected to this virtual network and reliable, it could be used for the transfer of all sorts of sensitive information. Similarly, financial intuitions can establish or lease secure, reliable connections or virtual networks that allow guaranteed delivery of secure and or time sensitive information.

Commercially, such connections could be charged for on the basis only of the guaranteed bandwidth provided and/or the maximum end-to-end latency, as well as the length of time they exist, without the service provider needing to monitor or collect data on their actual use. Furthermore, it must be possible to establish adequate security of such connections and to maintain that security against attack.

Embodiments of the present invention are intended to address at least some of the issues discussed above.

Embodiments of the present invention are intended to support virtual partitions that allow a subset of network traffic to be: secure (i.e. only come from and go to where it ought to); reliable (i.e. transmissions would not be lost due to excessive loads on the network), and, possibly, delivered in a timely manner (i.e. maximum transfer times across the network can be predicted).

Embodiments can allow for both point-to-point and multi-source, multi-drop connections. These multi-source/drop connections may be equivalent to slices taken off the Internet's physical layer (or layer 2 or 3 of the OSI 7-layer model), and reserved for special purposes. There may be multiple such virtual partitions within any portion of the layer, which could touch, overlap, or be entirely separate, and could be physically connected to the parts of the Internet physical layer that does not use or support such partitioning.

Typically, the virtual partitions may only reduce the bandwidth available to the remainder of users by the bandwidth that is actually used by them, not the bandwidth that is accessible to them. Thus, whilst guaranteed bandwidth is reserved for them, it may not be actually allocated to them until it is needed. This may not be true of the buffer memory in the switch-router devices, where some specific amount of memory would be reserved and would therefore be inaccessible to other users. However, as the cost of memory continues to fall this may be less of a problem over time.

The requirements can apply to the entire set of networks, any portions thereof, and any interconnections in or between these networks, that the connections of a virtual partition are routed through, from the first switch or router to the last that is outside any user network at the source and destination. However, the first and last of these switch-routers could be within the user/customer's premises, if the security of their configuration can be guaranteed.

According to one aspect of the present invention there is provided a data transfer system including or comprising:

a set of switch and/or router devices, each said device in the set being a layer 1, 2 and/or 3 device of OSI seven-layer model and being configured, in use, to transfer data, directly or indirectly, between a plurality of computing devices;

wherein each said switch or router device in the set is configured to provide a virtual partition, wherein only data designated as virtual partition data is transferrable to another said device in the set via the virtual partition, said virtual partition data being identified with a specific VLAN Id associated with at least a subset of the ports of said devices; and wherein said devices are configured to prevent said specific VLAN Id from being changed.

In order to prevent the specific VLAN Id from being changed, once assigned, the MVRP on at least some of said devices may be disabled.

The virtual partition data may be assigned a high priority level. The high priority level may be provided by re-mapping a set of service classes to one less priority than conventionally used.

According to a second aspect of the present invention, there is provided a data transfer system including:

a set of switch and/or router devices (104B, 104E, 104F), each said device in the set being a layer 1, 2 and/or 3 device of OSI seven-layer model and being configured, in use, to transfer data, directly or indirectly, between a plurality of computing devices (102A, 102B), wherein each said switch or router device in the set is configured to provide a virtual partition (VP), wherein only data designated as virtual partition data is transferrable to another said device in the set via the virtual partition, said virtual partition data being assigned a highest priority level which is provided by re-mapping a set of conventional service classes to one less priority than conventionally used, with a freed priority level being assigned as the highest priority level.

The virtual partition data, in this case, may be identified with a specific VLAN Id associated with at least a subset of the ports of said devices; and said devices may be configured to prevent said specific VLAN Id from being changed. In order to prevent the specific VLAN Id from being changed, once assigned, the MVRP on at least some of said devices may be disabled.

In the case of both aspects of the invention, the devices in the set may be configured to provide prioritization, secure routing, and strict bandwidth control of the virtual partition data. At least one of the devices in the set may also be able to transfer data that is not designated as virtual physical layer partition data by resources other than those provided to the virtual partition.

A said device in the set can be configured to use a separate buffer for the virtual partition traffic. The separate buffer will normally be given strict priority over other buffer(s) in the device. The device may be configured not to transmit data from the other buffer(s) unless the separate buffer for the virtual partition traffic is empty.

A said device in the set may include bandwidth control means to limit traffic on the virtual partition to a traffic profile. Typically, the traffic profile will be described by a nominal bandwidth, a maximum message length and a maximum delay variation or jitter tolerance.

The devices in the virtual partition set can be used to transfer data relating to television/video data to a user terminal separately from conventional television/video programmes being broadcast over conventional cable/satellite links.

In one specific exemplary embodiment of the invention, at least two subsets of switch and/or router devices are provided on a single layer of the OSI seven-layer model, each said subset of devices being configured to provide a respective virtual partition, wherein each virtual partition has a unique VLAN Id associated therewith, such that only data designated and identified as virtual partition data by a VLAN Id associated with a specific one of said virtual partitions is transferrable to another device in the respective subset via that specific one of said virtual partitions.

According to another aspect of the present invention there is provided a communications network including at least one switch and/or router device and a plurality of computing devices substantially as described herein.

According to yet another aspect of the present invention there is provided a layer 1, 2 and/or 3 device of OSI seven-layer model configured substantially as described herein.

According to a further aspect of the present invention there is provided a method of providing data transfer between computing devices, the method including configuring at least one switch and/or router device, in use, to transfer data, directly or indirectly between computing devices substantially as described herein. The method may be in the form of a computer program product or firmware in a processor on board, or associated with, a said device in the set.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments.

Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

The invention may be performed in various ways, and, by way of example only, embodiments thereof will now be described, reference being made to the accompanying drawing in which:

FIG. 1 shows a network including switch/router devices configured to provide a virtual partition.

FIG. 1 shows part of a network including a plurality of computing devices 102A, 102B, 102C that are in communication with each other via a plurality of switch and router devices 104A-104F, all of which are at layer 1, 2 and/or 3 of OSI seven-layer model. A subset of these switch/router devices comprising devices 104B, 104E, 104F are configured to provide a virtual partition (designated "VP" in the FIGURE) that can be used to transfer secure data between computing devices 102A and 102B. Thus, an example secure virtual partition connection is defined from device 104B via device 104E to device 104F, as shown by the arrows.

For the avoidance of doubt, a virtual partition is effectively a logical partition comprising a subset of (computer or network) resources virtualised as a separate computer or network. This subset of resources can be considered as a so-called intranet, and the special character of this configuration is that the portion of the infrastructure running the intranet does not have to be connected to the rest of the infrastructure through firewalls, etc. Therefore, if a new connection is added, the security of the intranet is not compromised.

It will be appreciated that the arrangement of FIG. 1 is exemplary only and that many variations are possible in terms of the number and interconnection of the devices. For instance, in some cases all of the switch/router devices 104A-104F may be configured to provide the virtual partition between more than two computing devices 102. In other embodiments, all or some of the devices 104A-104F may be configured to provide more than one virtual partition, which can be different virtual partitions for providing secure communication between different combinations of computing devices 102A-102C.

In some cases, the virtual partitions may be provided by devices 104B, 104E, 104F at ISO layer 2, using VLANs; however, in some cases it is possible for switches within the infrastructure to be dumb layer 1 or 2 switches, or even IP layer (layer 3) switches, as long as all those at the periphery of the virtual partition can be configured to abide by partitioning rules, which will be described below. Some embodiments can implement the virtual partition on the devices 104 using OpenFlow, an open version of a Software Defined Networking (SDN) protocol. Version 1.3 of OpenFlow includes functionality including traffic policing for packet inspection, which can enforce prioritization. Hardware compliant with Version 1.3 of OpenFlow can be configured to provide connection admission control to avoid real-time connections being congested (statistically or in reality). The virtual partition devices will require specific functions to support the connections, e.g. VLANs that can be securely configured. Switches require per connection traffic policing, and for truly reliable transfers, the buffer sizes have to be known and the bandwidths and burstiness (jitter) values of all connections routed through a buffer have to be used to check that it will not overflow. This can be done at the time the system is designed, or as part of connection admission control.

The interesting thing is that the requirements for the switches should be covered by the COTS Software Defined Network (SDN) protocol of OpenFlow v1.3 (when it is rolled out).

Hardware including a processor and memory on board, or associated with, a device 104B, 104E, 104F in the virtual partition set can include instructions that provide secure prioritization, secure routing and strict bandwidth control of the virtual partition traffic. The instructions can check if received data can be identified (e.g. using an identifier in its header) as virtual partition data and then treat it as data that is to be transferred via the virtual partition. Secure prioritization of the traffic using the virtual partition (or one of several virtual partitions) separates the virtual partition from all other traffic using the same layers/devices. Secure routing of the connections separates traffic of different virtual partitions that do not share resources, such as switch outputs and switch buffers. Strict bandwidth control of this traffic can limit the possible interactions between virtual partitions that do share resources to predictable levels, in effect, separating virtual partitions form one another.

It is also a preferred requirement that the functions that perform the routing, prioritization and bandwidth control of these virtual partition connections have to be configured securely. However, the configuration of these switches for any other (non-virtual partition) traffic would not need to be secure, their transport would not need to be prioritized, and this traffic would not need to have any form of bandwidth control applied, i.e. it would be routed in exactly the same way as at present.

The providers of these deterministic virtual partition connection services, or Deterministic Connection Service Providers (DCSPs), may also have to limit the number of deterministic connections at each switch port and the bandwidths these are allocated to virtual partitions to levels that cannot cause the switch buffers to overflow. They can also ensure that, at each output of the switch-routers used by one or more of these virtual partition connections, these are prioritized above all other traffic using that output. This can mean using switches in these partitions (or limiting the partitions to switches) that provide at least one more priority than is the norm under existing operation conditions; however, it can also be done by re-mapping a conventional set of service classes to one less priority than currently used, all except the very highest. Traffic identified to one of these deterministic connections would then use this new or newly freed highest priority.

The switch-router devices 104 in the virtual partition set can be configured to use separate buffers for the virtual partition traffic, which will be given strict priority over all the others. This means that no traffic is transmitted from a lower priority buffer unless this highest priority buffer is empty. It is assumed that, to allow for the prediction of the interactions between traffic in these highest priority buffers, each is either associated with specific output of the switch-router or they are parts of a shared, centralized buffer, which may be modelled as a set of virtual output buffer. However, there may also be techniques for predicting the interactions in input buffers, especially where head of line blocking can be avoided, and distributed buffers.

As an example for a network using Ethernet (although it will be understood that alternative embodiments can work on different networks), all traffic using one of the virtual partitions can be identified with a specific VLAN Id. As is current practice, a VLAN used for a virtual partition is then associated with a subset of the ports of a subset of the switches in the network. However, in this case, this association would have to be inaccessible except to the virtual partition data, i.e. it cannot be possible for any other party to change the associations for this VLAN. This can include defense against such mechanisms as VLAN hopping, where an Ethernet frame is double tagged with an inner tag that contains the VLAN Id of a secure virtual partition, in the expectation that a switch or router in the network will strip the outer tag at a port that is also used for this virtual partition. This may be accomplished by ensuring that the ports that are used for these virtual partitions cannot perform any form of tag stripping.

It is essential to establish security of the virtual partition and also to maintain that security against attack. In an Ethernet network, for example, secure configuration of those aspects that control the route, prioritization, and bandwidth control, of these deterministic connections means that the routes, priority, and policing, of the VLANs VCs that these connections use cannot be altered other than by the DCSPs/ virtual partition devices. As an example for a portion of the physical layer of the Internet using Ethernet, this means that once a VLAN Id is assigned to one of these connections by the DCSPs, no other party, not even the users of the virtual partition connections, can alter the parameters that apply to it, and that VLAN Id cannot be re-used for any other connection (deterministic or otherwise) that is routed through any of the same ports of the switch-router devices it uses—in most if not all current switches, this would mean that this VLAN Id cannot be re-used at any switch the deterministic connection using it goes through, though this is an aspect of switch design that could be modified so that it applies only to specific switch ports.

In any event, this is preferably achieved by configuring the relevant switches so that at least certain VLAN Ids are excluded from the "power to change" option in the case of a general Ethernet network; or, in the case of a bespoke internal system, by disabling the MVRP on relevant switches during their configuration. MVRP (Multiple VLAN Registration Protocol) is a standards-based layer 2 network protocol for automatic configuration of VLAN information on switches. The main purpose of MVRP is to allow switches to automatically discover some of the VLAN information that would otherwise need to be manually configured. In short, MVRP helps to maintain VLAN configuration dynamically based on current network configurations. Thus, by disabling this function on a switch, once a specific VLAN Id has been assigned, it cannot be changed.

In other words, and in all cases, configuring the relevant switches to disable the ability of at least certain VLAN Ids to be changed once they have been assigned thereto. This should also include the use of the highest priority, which MVRP cannot be allowed to use for any traffic outside that in the virtual partition.

In the case of an Ethernet network, in particular, this modification can be important, since the number of such connections is limited by the size of the VLAN Id, at 12 bits, to 4094 (two values are reserved). If this were a per switch limit, there can still be very large numbers of them, as the can be reused for connections that do not cross at these switches. However, if it were a per port limit, then there can be significantly more such deterministic connections, as the limit is then that connections with the same VLAN Id cannot share a serial, physical layer connection between two switch-routers, but can cross at the switch routers with impunity.

It will be appreciated that this aspect can be extended to provide two logically separated functions on a single layer of an ISO seven-layer model. Thus, if a secure, virtual partition provided on layer 2, for example, uses layer 3 routing as well, there would need to be two fully separated functions for layer 3 routing: one for secure traffic on the virtual partition, and one for the layer 3 routing of internet traffic. Whilst these functions would exist in the same switch and deal with traffic ingressing and egressing the same switch ports, they would be totally exclusive with regard to which traffic they route according to the specific VLAN Id associated with the virtual partition data, which cannot be changed.

Bandwidth control means that every switch-router that comprises any virtual partition can limit the traffic on each of these connections, independently, to a traffic profile. Typically, this profile will be described by a nominal bandwidth, a maximum message length, and a maximum delay variation or jitter tolerance. However, where a token bucket or leaky bucket (as a meter) algorithm is used to do test of conformance as part of bandwidth limitation, the message length and jitter parameters can be combined into a single bucket depth parameter.

Whilst all switch-router devices 104 in the virtual partition set should limit the traffic on each of the virtual partition connections, this may not be a requirement that must be applied to all switches. If this traffic control is applied in every switch that connects hosts to a virtual partition (Usage Parameter Control) then this can protect the reliability of the virtual partition against faulty and malicious users. However, it may also be necessary to implement this traffic control wherever different virtual partitions overlap (Network Parameter Control), to protect one partition against faults and failures in the other.

Providing reliability, and in some cases timeliness, may be achieved by ensuring that the path through each switch-router in the virtual partition set has to be assigned a maximum value for the delay and jitter (delay variation) it can add to any of these deterministic connections that are routed through it, and these maximums cannot be allowed to be exceeded. The maximum delay and jitter for a switch-router can then be used as part of the calculation of the maximum end-to-end delay for any connection routed through that switch-router, and the jitter it adds used as part of calculating the expected maximum jitter at any downstream switch-router on these paths. The maximum buffer requirement for the deterministic traffic at any switch output can then be calculated from the policed bandwidths, maximum message lengths and jitter tolerances for each of the connection as set by the traffic policing functions in the switches.

This maximum buffer usage can then be used to check that the switch in the virtual partition set has a big enough buffer for that priority at that output, or that the total requirement for all the outputs of a switch is less than the buffer memory available, for that priority, in the switch. The buffer usage value for a single switch output can then also be used to calculate a maximum buffer delay (the usage divided by the output's bandwidth). This can be compared with the values for the maximum possible delay and the maximum possible jitter that it can added, that have been allocated to that switch and output. If the computed maximum delay and added jitter are less than the allocated values, then the set of connections routed through that output is acceptable. If either is larger than the allocated value, then one or more of the connections cannot be supported. This makes it possible to check if a new deterministic connection can be routed through a specific switch-router without adversely affecting the guarantees for the connections that have already been established.

The use of redundant connections, to guard against hardware failures is a higher level issue. However, connections can be configured so that there are multiple paths between the hosts connected to it, exactly as can be done with physical networks. In which case, it would be possible to use spanning tree protocols to provide tolerance of failures in the network; albeit with a hiatus in service whilst the connections are, in effect, routed around a failed component or path element.

The users of a virtual partition normally have to abide by the traffic profile applied at the point of ingress to this virtual network, i.e. the traffic control parameters set for the Usage Parameter Control. Failure to abide to this profile would result in some arbitrary portion of the traffic presented being discarded. However, it is understood that higher layer assured transport protocols, such as TCP/IP, have the ability to, in effect, learn what these traffic limits are, and will, in general, settle to a rate just lower than this. However, where timely transfers are provided and used, such assured protocols are not appropriate, and the users would have to limit their own transmissions to avoid such losses.

The users of virtual partitions can also have access to the normal Internet through the same connections, or, their access to these virtual partitions would be through their current connections to the Internet. All that is required for this is that they identify the different types of traffic appropriately.

As an example of the user access, where the connection to the Internet is provided by an Ethernet physical layer link, e.g. Gigabit or 10 Gigabit Ethernet or higher, the identification could be by VLAN Id. In which case, all transmissions by this user would have to be tagged and the deterministic traffic tagged with a VLAN Id value matching the virtual partition. The first and last of these switch-routers could be within the user/customer's premises (or sole control), if the security of their configuration can be guaranteed. Alternatively, the first switch outside the user's network can identify those destinations on the virtual partition by, e.g. their IP address. Included with this deterministic traffic, and thus needing to be tagged by the user or first switch as such, would be the additional IP traffic needed to initiate communications, e.g. ICMP and ARP request and responses. Failing to tag these auxiliary messages correctly can cause functions like ARP to fail.

One particular embodiment of the system can provide video/television content to users. Currently, broadband connections to home users have a small bandwidth in comparison to the full range of scheduled TV being broadcast in real-time on BBC, ITV, 4, C5, and SKY, etc in the UK, but not catch-up TV or "timed repeat", e.g. +1 h, channels. In this case, a real-time network, partly, delivers the selected channels (a small number to watch and, possibly, a small number to record), but also to transport all the viewers' channel selection demands to wherever the selection is made (somewhere where there is sufficient bandwidth, so that the full set of channels can be delivered there, e.g. a local exchange). The virtual partition arrangement can be used to transfer data relating to television/video data to a user terminal in addition to conventional programmes being broadcast in real-time over conventional cable/satellite links. Therefore, on-demand type programmes can be delivered to consumers without the transmission problems currently associated with home broadband. Servers running an application such as the BBC's iPlayer™ have to have separate TCP connections to each viewer (or any other protocol that responds to congestion by re-trying lost frames (packets), and thus uses acknowledgments of those received), and if there are too many users at the same time then they fail to deliver an acceptable performance. However, using the virtual partition arrangement described herein can make the connections sufficiently reliable (real-time).

The invention claimed is:

1. A data transfer system including:
   a set of switch and/or router devices, each said device in the set being a layer 1, 2 and/or 3 device of OSI seven-layer model and being configured, in use, to transfer data, directly or indirectly, between a plurality of source computing devices and a plurality of destination computing devices via one or more ports of the respective switch and/or router device;
   wherein each said switch and/or router device in the set is configured to provide a virtual partition (VP) contained within at least one OSI layer for data transfer from any of the plurality of source computing devices to any of the plurality of destination computing devices via a buffer dedicated to the VP,
   wherein each said switch and/or router device in the set is further configured such that only data designated as virtual partition data is transferrable to another said switch and/or router device in the set via the virtual partition, said virtual partition data being identified with a specific VLAN Id associated with at least a subset of the ports of said switch and/or router devices,
   wherein each said switch and/or router device in the set is further configured to limit traffic on the VP based at least in part on a buffer size of the respective switch and/or router device, and also to transfer other data in the same OSI layer or layers containing the VP to another said switch and/or router device in the set via a separate buffer only while the buffer dedicated to the VP is empty, wherein the buffer dedicated to the VP is given priority over the separate buffer so as to guarantee bandwidth allocated through the respective switch and/or router device for transferring the virtual partition data within a maximum transfer time, and
   wherein said switch and/or router devices are configured to prevent the specific VLAN Id from being changed by disabling a function of said device for associating the VLAN Id to, and removing the VLAN Id association from, any port of said switch and/or router device after the specific VLAN Id has been so associated.

2. The system according to claim 1, wherein the set of switch and/or router devices are capable of discovering VLAN information via Multiple VLAN Registration Protocol (MVRP), and wherein MVRP is disabled on at least some of said devices.

3. The system according to claim 1, wherein the virtual partition data is assigned a highest priority level which is provided by re-mapping a set of conventional service classes to one less priority than conventionally used, with a freed priority level being assigned as the highest priority level.

4. The system according to claim 1, wherein the devices in the set are configured to provide prioritization, secure routing, and bandwidth control of the virtual partition data.

5. The system according to claim 1, wherein at least one of the devices in the set is also able to transfer data that is not designated as virtual partition data using resources other than those provided to the virtual partition.

6. The system according to claim 1, wherein a said device in the set includes bandwidth control to limit traffic on the virtual partition to correspond to a traffic profile.

7. The system according to claim 1, wherein the devices in the set are used to transfer data relating to television/video data to a user terminal separately from conventional television/video programmes being broadcast over conventional cable/satellite links.

8. The system according to claim 1, wherein at least two subsets of switch and/or router devices are provided on a single layer of the OSI seven-layer model, each said subset of devices being configured to provide a respective virtual partition, wherein each virtual partition has a unique VLAN Id associated therewith, such that only data designated and identified as virtual partition data by a VLAN Id associated with a specific one of said virtual partitions is transferrable to another device in the respective subset via that specific one of said virtual partitions.

9. A data transfer system having a communications network including at least one switch and/or router device according to claim 1.

10. A data transfer system including:

a set of switch and/or router devices, each said device in the set being a layer 1, 2 and/or 3 device of OSI seven-layer model and being configured, in use, to transfer data, directly or indirectly, between a plurality of source computing devices and a plurality of destination computing devices via one or more ports of the respective switch and/or router device;

wherein each said switch and/or router device in the set is configured to provide a virtual partition (VP) contained within at least one OSI layer for data transfer from any of the plurality of source computing devices to any of the plurality of destination computing devices via a buffer dedicated to the VP, wherein each said switch and/or router device in the set is further configured such that only data designated as virtual partition data is transferrable to another said switch and/or router device in the set via the virtual partition, said virtual partition data being assigned a highest priority level which is provided by re-mapping a set of conventional service classes to one less priority than conventionally used, with a freed priority level being assigned as the highest priority level, wherein each said switch and/or router device in the set is further configured to limit traffic on the VP based at least in part on a buffer size of the respective switch and/or router device, and also to transfer other data in the same OSI layer or layers containing the VP to another said switch and/or router device in the set via a separate buffer only while the buffer dedicated to the VP is empty, wherein the buffer dedicated to the VP is given priority over the separate buffer so as to guarantee bandwidth allocated through the respective switch and/or router device for transferring the virtual partition data within a maximum transfer time, wherein said virtual partition data is identified with a specific VLAN Id associated with at least a subset of the ports of said switch and/or router devices, and wherein said switch and/or router devices are configured to prevent the specific VLAN Id from being changed by disabling a function of said device for associating the VLAN Id to, and removing the VLAN Id association from, any port of said switch and/or router device after the specific VLAN Id has been so associated.

11. The system according to claim 10, wherein the set of switch and/or router devices are capable of discovering VLAN information via Multiple VLAN Registration Protocol (MVRP), and wherein MVRP is disabled on at least some of said devices.

12. A method of providing data transfer between computing devices, the method comprising:

configuring at least one switch and/or router device of a set to operate in a data transfer system, each said device in the set being a layer 1, 2 and/or 3 device of OSI seven-layer model and being configured, in use, to transfer data, directly or indirectly, between a plurality of source computing devices and a plurality of destination computing devices via one or more ports of the respective switch and/or router device;

wherein each said switch and/or router device in the set is configured to provide a virtual partition (VP) contained within at least one OSI layer for data transfer from any of the plurality of source computing devices to any of the plurality of destination computing devices via a buffer dedicated to the VP, wherein each said switch and/or router device in the set is further configured such that only data designated as virtual partition data is transferrable to another said switch and/or router device in the set via the virtual partition, said virtual partition data being identified with a specific VLAN Id associated with at least a subset of the ports of said switch and/or router devices, wherein each said switch and/or router device in the set is further configured to limit traffic on the VP based at least in part on a buffer size of the respective switch and/or router device, and also to transfer other data in the same OSI layer or layers containing the VP to another said switch and/or router device in the set via a separate buffer only while the buffer dedicated to the VP is empty, wherein the buffer dedicated to the VP is given priority over the separate buffer so as to guarantee bandwidth allocated through the respective switch and/or router device for transferring the virtual partition data within a maximum transfer time, and wherein said switch and/or router devices are configured to prevent the specific VLAN Id from being changed by disabling a function of said device for associating the VLAN Id to, and removing the VLAN Id association from, any port of said switch and/or router device after the specific VLAN Id has been so associated.

13. The method according to claim 12, wherein the set of switch and/or router devices are capable of discovering VLAN information via Multiple VLAN Registration Protocol (MVRP), and wherein MVRP is disabled on at least some of said devices.

14. The method according to claim 12, wherein the virtual partition data is assigned a highest priority level which is provided by re-mapping a set of conventional service classes to one less priority than conventionally used, with a freed priority level being assigned as the highest priority level.

15. The method according to claim 12, wherein the devices in the set are configured to provide prioritization, secure routing, and bandwidth control of the virtual partition data.

16. The method according to claim 12, wherein at least one of the devices in the set is also able to transfer data that is not designated as virtual partition data using resources other than those provided to the virtual partition.

\* \* \* \* \*